Patented Aug. 7, 1945

2,381,702

UNITED STATES PATENT OFFICE 2,381,702

POLYMERIZATION INITIATOR

William D. Stewart, Akron, Ohio, assignor, by mesne assignments, to The B. F. Goodrich Company, Akron, Ohio, a corporation of New York No Drawing. Application August 23, 1941,
Serial No. 408,105

6 Claims. (Cl. 260—84.5)

This invention relates to the initiation of polymerization reactions, and particularly to the initiation of the polymerization of unsaturated organic compounds which are capable of undergoing an addition polymerization to form high molecular weight polymers.

A number of initiators for such polymerization reactions are well known. In many cases, however, it has been found that initiators which are effective at a certain pH do not function as initiators at another pH. Thus hydrogen peroxide, which is an excellent initiator under alkaline conditions, cannot be employed in polymerizations effected under acid conditions. Certain other initiators can be used under acid conditions but not under alkaline conditions.

I have now discovered that the polymerization of unsaturated organic compounds may be initiated over a wide pH range by means of periodates.

The method of this invention may be employed in connection with any addition polymerizations of unsaturated organic compounds which yield high molecular weight linear polymers, whether carried out in a homogeneous system or in the form of an aqueous emulsion. Such unsaturated organic compounds are generally compounds containing a methylene group attached to a carbon atom by a double bond, that is, compounds containing the structure

One important class of such compounds consists of monomers which contain a single olefinic double bond present in a

group wherein at least one of the disconnected valences is connected to an electron-attracting group, that is, a group which substantially increases the electrical dissymmetry or polar character of the molecule. Well-known monomers of this class include styrene, isobutylene, acrylonitrile, methyl methacrylate, methyl acrylate, vinyl chloride, vinyl acetate, methyl vinyl ether, methyl vinyl ketone, and similar unsaturated hydrocarbons, esters, ethers and ketones. Another well-known class of unsaturated organic compounds which contain a methylene group attached to a carbon atom by a double bond and are capable of undergoing an addition polymerization to form a linear polymer is the butadienes-1,3, by which is meant butadiene-1,3 commonly termed butadiene and its homologues and analogues which polymerize in essentially the same manner such as isoprene, piperylene, 2,3-dimethylbutadiene and chloroprene. The unsaturated organic compounds may be polymerized alone or in admixture with other monomers copolymerizable therewith.

Any desired periodate may be employed, the alkali metal periodates such as sodium periodate or potassium periodate, and ammonium periodate being the preferred materials. In emulsion polymerizations, water-soluble periodates should be employed. The amount of periodate employed is not critical, and may be varied over a wide range from .5% or less based on the monomers to 5% or even more.

As a specific example of the use of one of the initiators of this invention in an emulsion polymerization, a mixture of 55 parts by weight of butadiene and 45 parts of acrylonitrile was agitated at 30° C. in the presence of about 250 parts of a 3% solution of myristic acid which had been 85% neutralized with sodium hydroxide, 0.6 part of diisopropyl dixanthogen, and 1 part of sodium periodate. A high yield of the copolymer in the form of a synthetic rubber latex was obtained in 48 hours, although in the absence of sodium periodate no polymerization had occurred in 100 hours.

In another example, a mixture of 55 parts of butadiene and 45 parts of acrylonitrile was agitated at 30° C. in the presence of about 250 parts of a 2% solution of sodium lauryl sulfate, .01 part of cobaltous chloride and 2 parts of sodium periodate. The polymerization was complete in 110 hours, although in the absence of sodium periodate no polymerization had occurred in this length of time.

Polymerizations initiated with water-soluble periodates may be catalyzed by the presence of vitamins and compounds which initiate a root formation in plants. The addition of .5 part of thiamine hydrochloride to the emulsion at the beginning of the polymerization in the above example, for instance, decreased the time required for the polymerization to reach completion to 45 hours. The use of .75 part of beta(indole-3-propionic acid) in a similar manner decreased the time to 15 hours.

It has been found desirable to modify the properties of butadiene polymers and copolymers by the presence during the polymerization of certain sulfur-containing compounds such as the dialkyl dixanthogens, the higher tetraalkyl thiuram mono- and polysulfides, or mercapto alkyl thiazoles. These modifiers, as well as sulfur-containing alcohols and glycols such as beta-mercaptoethanol and beta-dithiodiglycol, are effective in emulsion polymerizations initiated with water-soluble periodates. Other modifiers such as carbon tetrachloride known to be useful in connection with the polymerization of monomers such as methyl methacrylate may also be employed in the practice of this invention.

While homogeneous polymerizations in the presence or absence of solvents may be initiated by means of periodates, it is preferred to effect the polymerization in the form of an aqueous emulsion. When the polymerization is effected under alkaline conditions, soaps such as sodium oleate, sodium myristate and potassium palmitate may be employed as the emulsifying agent. Under acid conditions, salts of organic basis containing long carbon chains such as hydrochloride of dimethylaminoethyloleylamide, and trimethylcetylammonium methyl sulfate may be employed. A number of synthetic saponaceous emulsifying agents including hymolal sulfates such as sodium lauryl sulfate and aryl sulfonates such as sodium isopropyl naphthalene sulfonate may be employed at any desired pH. It is an outstanding advantage of the initiators of this invention that they may be employed in conjunction with any of these emulsifying agents at a pH best suited to the particular emulsifying agent employed.

Periodates may be employed in conjunction with other initiators of polymerization such as hydrogen peroxide as well as other types of initiators such as diazoamine benzene, dipotassium diazomethane desulfonate, and triphenylazobenzene. The rate of polymerization may be increased by the use of catalysts for oxidation-reduction reactions such as small proportions of heavy metals salts and complexes of heavy metals with phosphates, aliphatic carboxylic acids, or sterols.

The employment of other procedures known to be useful in connection with the polymerization of unsaturated organic compounds which are capable of undergoing addition polymerization to form high molecular weight linear polymers is within the spirit and scope of the invention as defined in the appended claims.

I claim:

1. In a process of polymerizing by addition polymerization a polymerizable unsaturated organic compound which contains a methylene group attached by an olefinic double bond to a carbon atom in the structure

and which undergoes an addition polymerization to form a high molecular weight linear polymer, the step which comprises associating a periodate with the unsaturated organic compound prior to the polymerization to initiate the polymerization.

2. In a process of polymerizing in aqueous emulsion a polymerizable unsaturated organic compound which contains a methylene group attached by an olefinic double bond to a carbon atom in the structure

and which undergoes in aqueous emulsion an addition polymerization to form a high molecular weight linear polymer, the step which comprises including a water-soluble periodate in the emulsion to initiate the polymerization.

3. In a process of polymerizing in aqueous emulsion a mixture of copolymerizable unsaturated organic compounds which contain a methylene group attached by an olefinic double bond to a carbon atom in the structure

one of which is a polymerizable butadiene -1,3, the step which comprises including a water-soluble periodate in the emulsion to initiate the polymerization.

4. In a process of polymerizing in aqueous emulsion a mixture of butadiene-1,3 and acrylonitrile, the step which comprises adding a water-soluble periodate to the emulsion to initiate the polymerization.

5. In a process of polymerizing in aqueous emulsion a mixture of butadiene-1,3 and acrylonitrile, the step which comprises adding an alkali metal periodate to the emulsion prior to the polymerization to initiate the polymerization.

6. In a process of polymerizing in aqueous emulsion a polymerizable butadiene-1,3, the step which comprises including a water-soluble periodate in the emulsion to initiate the polymerization.

WILLIAM D. STEWART.